US006893547B2

(12) United States Patent
Gascoyne et al.

(10) Patent No.: US 6,893,547 B2
(45) Date of Patent: May 17, 2005

(54) APPARATUS AND METHOD FOR FLUID INJECTION

(75) Inventors: Peter Gascoyne, Bellaire, TX (US); Jody V. Vykoukal, Houston, TX (US); Jon Schwartz, Sugar Land, TX (US); Frederick F. Becker, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 497 days.

(21) Appl. No.: 09/883,109

(22) Filed: Jun. 14, 2001

(65) Prior Publication Data

US 2002/0063060 A1 May 30, 2002

Related U.S. Application Data

(60) Provisional application No. 60/211,516, filed on Jun. 14, 2000.

(51) Int. Cl.[7] ..................... G01N 27/447; G01N 27/453

(52) U.S. Cl. ....................................... 204/547; 204/643

(58) Field of Search ................................ 204/547, 643, 204/450, 600; 347/55

(56) References Cited

U.S. PATENT DOCUMENTS

| | | | | |
|---|---|---|---|---|
| 4,333,086 A | * | 6/1982 | Ebi | 347/55 |
| 4,390,403 A | | 6/1983 | Batchelder | 204/180 |
| 5,126,022 A | | 6/1992 | Soane et al. | 204/180.1 |
| 5,344,535 A | | 9/1994 | Betts et al. | 204/183.1 |
| 5,454,472 A | | 10/1995 | Benecke et al. | 209/127.1 |
| 5,486,337 A | | 1/1996 | Ohkawa | 422/100 |
| 5,569,367 A | | 10/1996 | Betts et al. | 204/547 |
| 5,571,401 A | | 11/1996 | Lewis et al. | 205/787 |
| 5,593,290 A | | 1/1997 | Greisch et al. | 417/478 |
| 5,632,957 A | | 5/1997 | Heller et al. | 422/68.1 |
| 5,653,859 A | | 8/1997 | Parton et al. | 204/450 |
| 5,683,569 A | | 11/1997 | Chung et al. | 205/775 |
| 5,795,457 A | | 8/1998 | Pethig et al. | 204/547 |
| 5,814,200 A | | 9/1998 | Pethig et al. | 204/547 |
| 5,858,192 A | | 1/1999 | Becker et al. | 204/547 |
| 5,888,370 A | | 3/1999 | Becker et al. | 204/547 |

(Continued)

FOREIGN PATENT DOCUMENTS

| | | |
|---|---|---|
| EP | 0513064 | 11/1992 |
| EP | 0625267 | 11/1994 |
| EP | 0680380 | 11/1995 |
| EP | 0691891 | 1/1996 |
| EP | 0898493 | 3/1999 |
| WO | WO 93/16383 | 8/1993 |
| WO | WO 94/16821 | 8/1994 |
| WO | WO 97/34689 | 9/1997 |
| WO | WO 99/36176 | 7/1999 |
| WO | WO 99/62622 | 12/1999 |
| WO | WO 00/47322 | 8/2000 |
| WO | WO 00/69565 | 11/2000 |

OTHER PUBLICATIONS

"Bangor biochip heads for California," EPSRC Home Page: http://www.epsrc.ac.uk/documents/about_epsrc/corporate_publi.../bangor.ht, article printed on Dec. 26, 2000.

(Continued)

*Primary Examiner*—Kishor Mayekar
(74) *Attorney, Agent, or Firm*—Fulbright & Jaworski LLP

(57) ABSTRACT

Methods and apparatuses for metered injection of a fluid packet. A vessel containing a fluid is pressurized to a pressure less than or equal to a hold-off pressure. The fluid is subjected to an extraction force to form the fluid packet and extract the fluid packet from the vessel onto a surface.

20 Claims, 7 Drawing Sheets

U.S. PATENT DOCUMENTS

| | | | | | |
|---|---|---|---|---|---|
| 5,965,452 | A | | 10/1999 | Kovacs | 436/149 |
| 5,993,630 | A | | 11/1999 | Becker et al. | 204/547 |
| 5,993,631 | A | | 11/1999 | Parton et al. | 204/547 |
| 5,993,632 | A | | 11/1999 | Becker et al. | 204/547 |
| 6,010,616 | A | | 1/2000 | Lewis et al. | 205/787 |
| 6,017,696 | A | | 1/2000 | Heller | 435/6 |
| 6,019,455 | A | * | 2/2000 | Taylor et al. | 347/54 |
| 6,024,925 | A | | 2/2000 | Little et al. | 422/100 |
| 6,090,251 | A | | 7/2000 | Sundberg et al. | 204/453 |
| 6,093,308 | A | | 7/2000 | Lewis et al. | 205/787 |
| 6,099,803 | A | | 8/2000 | Ackley et al. | 422/68.1 |
| 6,113,768 | A | | 9/2000 | Fuhr et al. | 204/643 |
| 6,129,828 | A | | 10/2000 | Sheldon, III et al. | 204/518 |
| 6,130,098 | A | | 10/2000 | Handique et al. | 436/180 |
| 6,159,188 | A | | 12/2000 | Laibovitz et al. | 604/294 |
| 6,165,417 | A | | 12/2000 | Swierkowski | 422/100 |
| 6,221,653 | B1 | | 4/2001 | Caren et al. | 435/287.2 |
| 6,224,745 | B1 | | 5/2001 | Baltruschat | 205/775 |
| 6,225,059 | B1 | | 5/2001 | Ackley et al. | 435/6 |
| 6,287,832 | B1 | | 9/2001 | Becker et al. | 435/173.9 |
| 6,294,063 | B1 | | 9/2001 | Becker et al. | 204/450 |

OTHER PUBLICATIONS

"Diagnostic dielectrophoresis–on–a–chip," *Science/Technology*, 77(8):32, 1999. Article printed from http://pubs.acs.org/hotartcl/cenear/99022/7708scitobox2.html on Dec. 26, 2000.

Allsopp et al., "Impedance technique for measuring dielectrophoretic collection of microbiological particles," *J. Phys. D: Appl. Phys.*, 32:1066–1074, 1999.

Balachandran et al., "Electrostatic atomization of conducting liquids using AC superimposed on DC fields," *IEEE Transactions on Industry Applications*, 30(4):850–854, 1994.

Cheng et al., "Preparation and hybridization analysis of DNA/RNA form *E. coli* on microfabricated biolectronic chips," *Nature Biotechnology*, 16:541–546, 1998.

El–Kishky and Gorur, "Electric field and energy computation on wet insulating surfaces," *IEEE Transaction on Dielectrics and Electrical Insulation*, 3(4):587–593, 1996.

El–Kishky and Gorur, "Electric field computation on an insulating surface with discrete water droplets," *IEEE Transactions on Dielectrics and Electrical Insulation*, 3(3):450–456, 1996.

Fuller et al., "Microfabricated multi–frequency particle impedance characterization system," *Micro Total Analysis System*, van den Berg et al. (eds.), 265–268, 2000.

Galicki et al., "Electrohydrodynamic atomization of dielectric fluids," *Conference on Electrical Insulation and Dielectric Phenomena*, IEEE Annual Report, 365–368, 1996.

Gawad et al., "Impedance spectroscopy cell anaylsis in microchannels," *Micro Total Analysis Systems*, 253–255, 2001.

Gawad et al., "Micronarcined impedance spectroscopy flow cytometer for cell analysis and particle sizing," *Lab on a Chip*, 1:76–82, 2001.

He et al., "Droplet charge–to–mass ratio measurement in an EHD liquid—liquid extraction system," *IEEE Transactions on Industry Applications*, 32(1):146–154, 1996.

Higashiyama et al., "Behavior of water droplets located on a hydrophobic insulating plate under DC field," *IEEE*, 1808–1813, 1998.

Hoffman and Britt, "Flow–system measurement of a cell impedance properties," *J. Histochemistry and Cytochemistry*, 27:234–240, 1979.

Hoffman et al., "Flow cytometric electronic direct current volume and radiofrequency impedance measurements of single cells and particles," *Cytometry*, 1:377–384, 1981.

Hosokawa et al., "Handling of picoliter liquid samples in a Poly(dimethylsiloxane)–based microfluidic device," *Anal. Chem.*, 71:4781–4785, 1999.

Huneiti et al., "Harmonic spraying of conducting liquids employing AC–DC electric fields," *IEEE Transactions on Industry Applications*, 34(2):279–285, 1998.

Jones, Electromechanics of Particles, Cambridge University Press, Cambridge, Chapter 3:34–82, 1995.

Kashyap and Gratzl, "Electrochemistry in microscopic domains. 1. The electrochemical cell and its voltammetric and amperometric response," *Anal Chem.*, 70:1468–1476, 1998.

Kloes and Koenig, "Basic investigation of the performance of droplets on electrically stressed polymer surfaces," *Conference on Electrical Insulation and Dielectric Phenomena*, IEEE Annual Report, 374–377, 1997.

Lee and Kim, "Liquid micromotor driven by continuous electrowetting," *IEEE*, 538–543, 1998.

Metwally, "Electrostatic charging and modeling of aqueous sprays and fission of droplets," *Conference on Electrical Insulation and Dielectric Phenomena*, IEEE Annual Report, 117–120, 1996.

Mizuno et al., "Behavior of water droplets on silicone rubber sheet under AC voltage application," *IEEE*, 96–99, 1998.

Moesner et al., "Electrostatic devices for particle microhandling," *IEEE Transactions on Industry Applications*, 35(3):530–536, 1999.

Sathuvalli and Bayazitoglu, "The lorentz forces on an electrically conducting sphere in an alternating magnetic field," *IEEE Transactions on Magnetics*, 32(2):386–399, 1996.

Sato et al., "Experimental investigation of droplet formation mechanisms by electrostatic dispersion in a liquid—liquid system," *IEEE Transactions on Industry Applications*, 33(6):1527–1534, 1997.

Sato et al., "Production of oil/water type uniformly sized droplets using a convergent AC elctric field," *IEEE Transactions on Industry Applications*, 32(1):138–145, 1996.

Wang et al., "A theoretical method of electrical field analysis for dielectrophoretic electrode arrays using Green's theorum," *J. Phys. D: Appl. Phys.*, 29:1649–1660, 1996.

Wang et al., "Separation of polystyrene microbeads using dielectrophoretic/gravitational field–flow–fractionation," *Biophysical Journal*, 74:2689–2701, 1998.

Washizu, "Electrostatic actuation of liquid droplets for microreactor applications," *IEEE Transactions on Industry Applications*, 34(4):732–737, 1998.

Co–Pending U.S. Appl. No. 10/028,945 by Peter Gascoyne et al., filed Dec. 20, 2001.

* cited by examiner

APPARATUS AND METHOD FOR FLUID INJECTION

The present invention claims priority to U.S. Provisional Application No. 60/211,516 filed Jun. 14, 2000, herein incorporated by reference.

The government may own rights in the present invention pursuant to grant number N66001-97-C-8608 modification 3 from the Defense Advanced Research Projects Agency.

BACKGROUND OF THE INVENTION

1. Field of the Invention

The present invention relates generally to fluidic processing and, more particularly, to methods and apparatuses to controllably inject fluid packets onto a surface. Even more particularly, the present invention relates to methods and apparatuses for programmably injecting fluid packets onto a surface using dielectrophoretic forces.

2. Description of Related Art

Chemical protocols often involve a number of processing steps including metering, mixing, transporting, division, and other manipulation of fluids. For example, fluids are often prepared in test tubes, metered out using pipettes, transported into different test tubes, and mixed with other fluids to promote one or more reactions. During such procedures, reagents, intermediates, and/or final reaction products may be monitored, measured, or sensed in analytical apparatus. Microfluidic processing generally involves such processing and monitoring using minute quantities of fluid. Microfluidic processing finds applications in vast fields of study and industry including, for instance, diagnostic medicine, environmental testing, agriculture, chemical and biological warfare detection, space medicine, molecular biology, chemistry, biochemistry, food science, clinical studies, and pharmaceutical pursuits.

Current approaches directed at fluidic processing exhibit several shortcomings. One current approach to microfluidic processing utilizes a number of microfluidic channels that are configured with microvalves, pumps, connectors, mixers, and detectors. While devices using micro-scale implementations of these traditional approaches may exhibit at least a degree of utility, vast room for improvement remains. For instance, current microfluidic devices lack flexibility for they rely upon a fixed pathway of microchannels. With fixed pathways, devices are limited in the number and type of tasks they may perform. Also, using fixed pathways makes many types of metering, transport, and manipulation difficult. With traditional devices, it is difficult to partition one type of sample from another within a channel.

Other current approaches involve electrical properties of materials. In particular, certain electrical properties of materials have been employed to perform a limited number of fluidic processing tasks. For example, dielectrophoresis has been utilized to aid in the characterization and separation of particles, including biological cells. An example of such a device is described in U.S. Pat. No. 5,344,535 to Betts, incorporated herein by reference. Betts establishes dielectrophoretic collection rates and collection rate spectra for dielectrically polarizable particles in a suspension. Particle concentrations at a certain location downstream of an electrode structure are measured using a light source and a light detector, which measures the increased or decreased absorption or scattering of the light which, in turn, indicates an increase or decrease in the concentration of particles suspended in the fluid. Although useful for determining particle dielectrophoretic properties, such a system is limited in application. In particular, such a system does not allow for general fluidic processing involving various interactions, sometimes performed simultaneously, such as metering, mixing, fusing, transporting, division, and general manipulation of multiple reagents and reaction products.

Another example of using certain electrical properties for specific types of processing is disclosed in U.S. Pat. No. 5,632,957 to Heller et al., incorporated herein by reference. There, controlled hybridization may be achieved using a matrix or array of electronically addressable microlocations in conjunction with a permeation layer, an attachment region and a reservoir. An activated microlocation attracts charged binding entities towards an electrode. When the binding entity contacts the attachment layer, which is situated upon the permeation layer, the functionalized specific binding entity becomes covalently attached to the attachment layer. Although useful for specific tasks such as DNA hybridization, room for improvement remains. In particular, such a system, utilizing attachment sites for certain binding entities is designed for particular applications and not for general fluidic processing of a variety of fluids. More specifically, such a system is designed for use with charged binding entities that interact with attachment sites.

Another example of processing is disclosed in U.S. Pat. No. 5,126,022 to Soane et al., incorporated herein by reference. There, charged molecules may be moved through a medium that fills a trench in response to electric fields generated by electrodes. Although useful for tasks such as separation, room for improvement remains in that such devices are not well suited for performing a wide variety of fluidic processing interactions on a wide variety of different materials.

There are other examples of using dielectrophoresis for performing specific, limited fluidic processing tasks. U.S. Pat. No. 5,795,457 to Pethig and Burt, incorporated herein by reference, disclose a method for promoting reactions between particles suspended in liquid by applying two or more electrical fields of different frequencies to electrode arrays. While perhaps useful for facilitating certain interactions between many particles of different types, the method is not well suited for general fluidic processing. U.S. Pat. No. 4,390,403 to Batchelder, incorporated herein by reference, discloses a method and apparatus for manipulation of chemical species by dielectrophoretic forces. Although useful for inducing certain chemical reactions, its flexibility is limited, and it does not allow for general, programmable fluidic processing.

Methods and apparatuses to address many, if not all, of the shortcomings addressed above are disclosed in pending U.S. patent application Ser. No. 09/249,955, filed Feb. 12, 1999, now U.S. Pat. No. 6,294,063 and entitled, "Method And Apparatus for Programmable Fluidic Processing," which is incorporated herein by reference in its entirety. There, techniques are disclosed that relate to the manipulation of a packet of material using a reaction surface, an inlet port, means for generating a programmable manipulation force, a position sensor, and a controller. In one embodiment of that disclosure, the material is introduced onto the reaction surface with the inlet port. The material is compartmentalized to form a packet. The position of the packet is sensed with the position sensor. A programmable manipulation force (which, in one embodiment, may involve a dielectrophoretic force) is applied to the packet at a certain position with the means for generating a programmable manipulation force, which is adjustable according to the position of the packet by the controller. The packet may then be programmably moved according to the programmable manipulation force along arbitrarily chosen paths.

U.S. Pat. No. 5,858,192, entitled "Method and apparatus for manipulation using spiral electrodes", filed Oct. 18, 1996 and issued Jan. 12, 1999; U.S. Pat. No. 5,888,370 entitled "Method and apparatus for fractionation using generalized dielectrophoresis and field flow fractionation", filed Feb. 23, 1996 and issued Mar. 30, 1999; U.S. Pat. No. 5,993,630 entitled "Method and apparatus for fractionation using conventional dielectrophoresis and field flow fractionation," filed Jan. 31, 1996 and issued Nov. 30, 1999; U.S. Pat. No. 5,993,632 entitled "Method and apparatus for fractionation using generalized dielectrophoresis and field flow fractionation," filed Feb. 1, 1999 and issued Nov. 30, 1999; and U.S. patent application Ser. No. 09/395,890 entitled "Method and apparatus for fractionation using generalized dielectrophoresis and field flow fractionation," filed Sep. 14, 1999 now U.S. Pat. No. 6,287,832 are each herein incorporated by reference.

U.S. "Patent Application" with co-pending patent application Ser. No. 09/882,805 entitled "Method and apparatus for combined magnetophoretic and dielectrophoretic manipulation of analyte mixtures," filed Jun. 14, 2001; U.S. "Patent Application" with co-pending patent application Ser. No. 09/883,112 entitled "Dielectrically-engineered microparticles," filed Jun. 14, 2001; and U.S. Pat. No. 6,790,330 entitled "Systems and methods for cell subpopulation analysis," filed Jun. 14, 2001 are each herein incorporated by reference.

The techniques disclosed in U.S. patent application Ser. No. 09/249,955 now U.S. Pat. No. 6,294,063 offer significant advantages over the traditional methods discussed above. For instance, they permit the fluidic processing of minute quantities of samples and reagents. The disclosed apparatus need not use conventional hardware components such as valves, mixers, pump. The disclosed apparatus may be readily miniaturized and its processes may be automated or programmed. The disclosed apparatus may be used for many different types of microfluidic processing and protocols, and it may be operated in parallel mode whereby multiple fluidic processing tasks and reactions are performed simultaneously within a single chamber. Because it need not rely on narrow tubes or channels, blockages may be minimized or eliminated. Further, if obstructions do exist, those obstructions may be located and avoided with position sensing techniques.

In order to use the apparatus disclosed in U.S. patent application Ser. No. 09/249,955, now U.S. Pat. No. 6,294,063 a material must be introduced onto the reaction surface. As is disclosed in U.S. patent application Ser. No. 09/249,955, now U.S. Pat. No. 6,294,063 this may be done using an inlet port. The inlet port may simply be an opening in a wall, or, alternatively, it may be a syringe needle, a micropipette, a tube, an inkjet injector, or the like.

Although using a syringe, a micropipette, or the like allows for injection of material onto the surface, shortcomings remain. For instance, such an inlet does not always provide for systematic, controllable injection of material. In particular, using existing devices and techniques (including those disclosed in U.S. patent application Ser. No. 09/249,955 now U.S. Pat. No. 6,294,063) does not always ensure that a controllable, single drop is injected at a time. Rather, existing technology often results in the injection of one drop at one time, two drops together at another time, etc. Hence, the controllability and metering capabilities of existing technology is not completely adequate. Without controllable packet injection, the accuracy and repeatability of certain microfluidic processing tasks may suffer.

In light of the above, it would be advantageous to provide for technology in which metered packets of material could be systematically injected onto a surface in a reliable, repeatable manner. It would further be advantageous is the method of injection were automated so that processing could take place with little, or no operator intervention. Such advantages would benefit not only the microfluidic processing contemplated in U.S. patent application Ser. No. 09/249,955, now U.S. Pat. No. 6,294,063 but also in all realms of fluidic processing. In particular, such advantages would benefit any field in which a controllable manner of injecting packets of materials is desired.

Any problems or shortcomings enumerated in the foregoing are not intended to be exhaustive but rather are among many that tend to impair the effectiveness of previously known processing and fluid injection techniques. Other noteworthy problems may also exist; however, those presented above should be sufficient to demonstrated that apparatus and methods appearing in the art have not been altogether satisfactory and that a need exists for the techniques disclosed herein.

SUMMARY OF THE INVENTION

In one respect, the invention relates to a method for metered injection of a fluid packet. A vessel containing a fluid is pressurized to a pressure less than or equal to a hold-off pressure. The fluid is subjected to an extraction force to form the fluid packet and extract the fluid packet from the vessel onto a surface.

In other respects, the extraction may include dielectrophoresis. It may also include magnetophoresis or any other suitable force. The extraction force may produced by an electrode, an electrode array or any other suitable apparatus. The extraction force may be produced from the reaction surface.

In other respects, the vessel may comprise a flow-through injector. The pressure may be between 65% and 85% of the holdoff pressure, or more preferably between 75% and 85% of the holdoff pressure. The size of the packet may be electronically controlled.

Another aspect of the invention comprise removing the packet from the surface through an exit port. There may be two or more exit ports, and the exit ports may be coupled to a conventional fluidics device.

Yet another aspect of the invention comprises the method for metered injection of two or more fluid packets from two or more pressurized vessels. A switching pump may be used. The switching pump switches the extraction force between a first packet in a first pressurized vessel and a second packet in a second pressurized vessel.

In another respect, the invention relates to a method for metered injection of a fluid packet. A vessel containing a first fluid is pressurized to a pressure less than or equal to a hold off pressure, the first fluid including a first dielectric material, One or more electrodes coupled to a surface adjacent the vessel are energized, the surface including a second fluid comprising a second dielectric material. The first fluid is subjected to an extraction force from the one or more electrodes to form the fluid packet and extract the fluid packet from the vessel onto a surface.

In another respect, the invention relates to an apparatus for injecting a fluid packet onto a surface. The apparatus includes a vessel, a pressure manifold, a pressure reservoir, and a device capable of generating a programmable extraction force. The vessel is configured to contain a fluid. The pressure manifold is coupled to the vessel. The pressure reservoir is coupled to the manifold and is configured to pressurize the vessel to a pressure less than or equal to a hold off pressure. The extraction force is configured to form the fluid packet and extract the fluid packet from the vessel onto the surface. There may be two or more pressure reservoirs or the vessel may comprise a flow-through injector.

In yet another respect, the invention relates to an apparatus for moving a fluid packets. The apparatus includes a vessel, a pressure manifold, a pressure reservoir, a device capable of generating a programmable extraction force and an exit port. The vessel is configured to contain a fluid. The pressure manifold is coupled to the vessel. The pressure reservoir is coupled to the manifold and is configured to pressurize the vessel to a pressure less than or equal to a hold off pressure. The extraction force is configured to form the fluid packet and extract the fluid packet from the vessel onto the surface. The exit port is coupled to the surface and configured to receive the fluid packet. The exit port is preferably hydrophilic. There can be a plurality of exit ports. A conventional fluidics device may be coupled to the exit port.

The vessel may comprise a flow-through injector, and there may be two or more pressurized vessels. A switching pump may be used when there are more than one vessels or exit ports. The switching pump is configured to switch the extraction force between a first packet in a first pressurized vessel and a second packet in a second pressurized vessel.

As used herein, "packet" refers to compartmentalized matter and may refer to a fluid packet, an encapsulated packet, and/or a solid packet. A fluid packet refers to one or more packets of liquids or gases. A fluid packet may refer to a packet or bubble of a liquid or gas. A fluid packet may refer to a packet of water, a packet of reagent, a packet of solvent, a packet of solution, a packet of sample, a particle or cell suspension, a packet of an intermediate product, a packet of a final reaction product, or a packet of any material. An example of a fluid packet is a packet of aqueous solution suspended in oil. An encapsulated packet refers to a packet enclosed by a layer of material. An encapsulated packet may refer to vesicle or other microcapsule of liquid or gas that may contain a reagent, a sample, a particle, a cell, an intermediate product, a final reaction product, or any material. The surface of an encapsulated packet may be coated with a reagent, a sample, a particle or cell, an intermediate product, a final reaction product, or any material. An example of an encapsulated packet is a lipid vesicle containing an aqueous solution of reagent suspended in water. A solid packet refers to a solid material that may contain, or be covered with a reagent, a sample, a particle or cell, an intermediate product, a final reaction product, or any material. An example of a solid packet is a latex microsphere with reagent bound to its surface suspended in an aqueous solution. Methods for producing packets as defined herein are known in the art. Packets may be made to vary greatly in size and shape, but in embodiments described herein, packets may have a diameter between about 100 nm and about 1 cm.

As used herein, a "conventional fluidics device" is one that contains channels and/or tubes for fluid flow. A "vessel" is defined herein as a container or conduit capable of containing fluids.

BRIEF DESCRIPTION OF THE DRAWINGS

The following drawings form part of the present specification and are included by way of example and not limitation to further demonstrate certain aspects of the present invention. The invention may be better understood by reference to one or more of these drawings, in which like references indicate similar elements, in combination with the detailed description of specific embodiments presented herein.

DESCRIPTION OF ILLUSTRATIVE EMBODIMENTS

Figure 1:
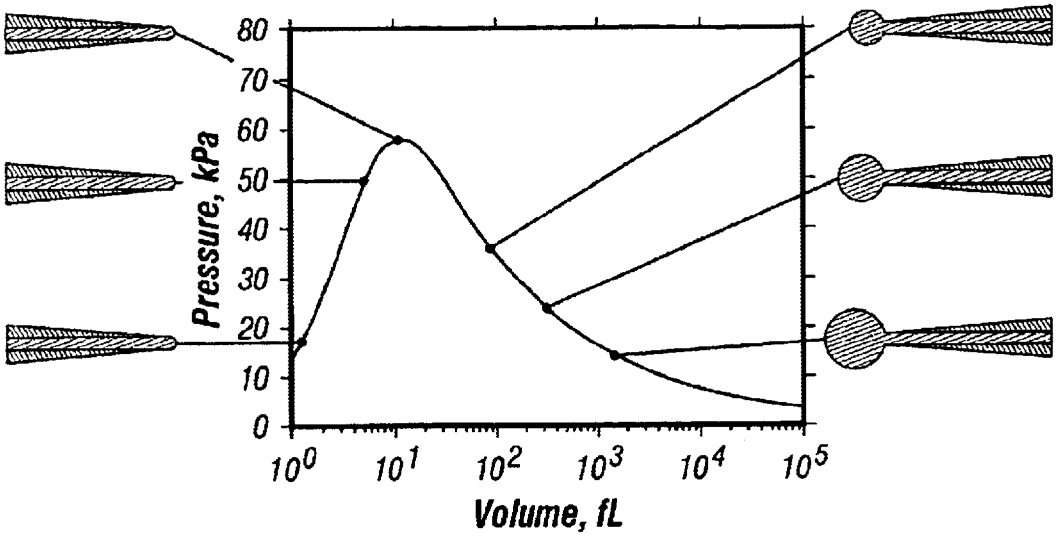
FIG. 1 is a graph and an illustration that demonstrates the pressure and volume characteristics for water packet formation from a 5 micron diameter micropipette according to embodiments of the present disclosure. In this figure, the peak pressure occurs when the radius of the packet is one-half the diameter of the tube orifice.

The presently disclosed methods and apparatuses provide many advantages. For instance, they permit for the high-resolution, metered injection of fluid packets that, in turn, allows for fluidic processing of minute quantities of samples and reagents. They permit automated fluid injection that may be programmed according to a particular fluidic processing application. They allow for the fluid packets of different volume to be created and injected in a highly controllable, consistent manner. The ability to create and inject such metered packets provides for the ability to perform accurate, automated microfluidic processing in a variety of different fields. The apparatuses described herein may be readily miniaturized (or made larger) to fit the needs of the user. Its processes may be automated or programmed, manual, or partially automated. The techniques disclosed herein may be used for many different types of microfluidic processing and protocols, and it may be used in processes that are operated in parallel mode, whereby multiple fluidic processing tasks and reactions are performed simultaneously within a single chamber. Areas that may benefit from this technology include, but are not limited to: blood and urine assays, pathogen detection, pollution monitoring, water monitoring, fertilizer analysis, the detection of chemical and biological warfare agents, food pathogen detection, quality control and blending, massively parallel molecular biological protocols, genetic engineering, oncogene detection, and pharmaceutical development and testing.

Because the present disclosure deals, in part, with the formation and injection of fluid packets, it is useful to begin the discussion with some theoretical underpinnings of the techniques disclosed herein.

Packet Volume-Pressure Characteristics

To understand modes of operation of a packet injector that uses dielectrophoretic extraction forces, it is useful to first consider the pressure that must be applied to a fluid-filled tube in order to cause the formation of a fluid packet at the open end of tube. Here, the case is considered in which the diameter of the tube orifice is sufficiently small so that surface-energy effects cause the fluid to form a smooth front and that, initially, the applied pressure is low enough so that the fluid fills the tube flush with its end. As the pressure is increased, it is assumed that the shape of the emerging packet approximates a segment of a spherical surface. The pressure inside a packet is proportional to the interfacial tension $\gamma$ at its surface and inversely proportional to its radius r, and is given by:

$$P = \frac{2\gamma}{r}.$$

Initially, when the packet is flush with the end of the tube, the effective radius is infinite, and so the pressure is equal to zero. As the fluid surface becomes more curved, the radius decreases. However, once the packet forms a hemisphere at the orifice of the tube, any further increase in volume again results in an increase in packet radius. As the packet continues to grow, its internal pressure decreases as r continues to increase. Thus, the minimum radius depends on the diameter of the orifice and this, in turn, determines the maximum pressure in the packet.

This effect is illustrated in FIG. 1, which shows, in the side panels, the appearance of fluid emerging from the tip of a micropipette and, on the graph, the corresponding pressure inside the packet during packet formation. It is apparent from FIG. 1 that if the fluid is pressurized to form a packet that is less than hemispherical, packet formation will proceed no further because additional pressure would be required to accomplish this. In this case, it may be said that packet formation is "held off". However, if the pressure is increased to the peak value, fluid will flow into the packet continuously because increasing the packet size above the hemispherical condition occurs easily as the internal packet pressure falls with increasing volume. The peak pressure is termed the "hold-off pressure," because until that pressure is reached, packet formation will not proceed.

In injector designs described herein, an injector tip may be connected to a fluid reservoir formed either by the bore of a tube or by a larger fluid container to which the other end of the bore is connected. Such a fluid reservoir may be pressurized to a pressure $P_f$ that may be provided by an external pressure source derived from any suitable source such as a gas pressure, a pump, a membrane under compression, an electroosmotic fluid pressure source, or any other device as is known in the art. The pressure value $P_f$ may be kept below the hold-off pressure for the injector so that packet formation is held-off as shown in the left hand panel of FIG. 1.

Dielectrically-Induced Forces on a Packet

In one embodiment, electrical forces may be used to influence the formation of packets like those described above. Because the electrical equations are geometry dependent, however, the theoretical discussion presented here is meant to be illustrative only and not limiting. Specifically, it illustrates the physical principles rather than providing specific equations applicable to all different geometrical arrangements. One having skill in the art will recognize that in any given embodiment, the exact form of the equations may differ somewhat from those presented here, but the physical principles governing packet injection will be similar, if not the same. Thus, having the benefit of the illustrative examples given herein, equations and solutions applicable to arbitrarily different arrangements will be readily apparent to those having skill in the art.

If a small sphere of a first dielectric material (which may include a solid, liquid or gas) is introduced into a second, dissimilar dielectric material to which an electrical field is applied, the energy of the combined system of dielectric materials will be changed, in comparison with the energy before the introduction occurred, as the result of the difference in the polarizabilities of the two dielectric materials. This energy change is proportional to W, which may be approximated as $$W=2\pi\epsilon_s r^3 f_{CM}\bar{E}^2$$

where $\bar{E}$ is the electrical field, $\epsilon_s$ is the permittivity of the second dielectric material, r is the radius of the small sphere, and $\bar{E}$ is the applied electrical field. The term $f_{CM}$ is the so-called Clausius-Mossotti factor, known in the art, that expresses the polarizability of the sphere in terms of the differences between complex dielectric permittivities of the first material, $\epsilon^*_f$, and that of the second material, $\epsilon^*_s$, and, if the electrical field is not traveling through space, is given by $$f_{CM} = Re\left(\frac{\varepsilon_f^* - \varepsilon_s^*}{\varepsilon_f^* + 2\varepsilon_s^*}\right).$$

For the present discourse, assume that the first dielectric material is the fluid that is about to be injected from the end of a tube as shown in the left-hand panel of FIG. 1 and that the second material is an immiscible liquid or gas that surrounds the end of the tube and the emergent fluid. The second liquid or gas may be called the "suspending medium."

An applied electric field emanating from the end of the tube will tend to alter the pressure at the fluid-suspending medium interface, and this pressure change will in turn alter the volume of the packet according to FIG. 1. The pressure change may be estimated by determining the rate of change of electrical energy, W, with fluid radius, r. This is given by $$F_{dielectric} = \frac{\partial W}{\partial r} = 3\pi\varepsilon_s r^2 f_{CM}\bar{E}^2 + 2\pi\varepsilon_s r^3 f_{CM}\bar{E}\cdot\frac{\partial \bar{E}}{\partial r}.$$

The term $3\pi\epsilon_s r^2 f_{CM}\bar{E}^2$ represents a force that results from the dielectric energy change associated with displacement of the suspending medium by the injected fluid. The term $$2\pi\varepsilon_s r^3 f_{CM}\bar{E}\cdot\frac{\partial \bar{E}}{\partial r}$$

is a dielectrophoretic term that acts on the fluid as the result of inhomogeneity in the electrical field. The effect of these two force contributions on the pressure in the fluid can be estimated by determining the corresponding pressure change, P, or force per unit area, that results at the fluid-suspending medium interface:

$$P = \frac{F_{dielectric}}{A_{fluid}} = \frac{F_{dielectric}}{4\pi r^2} = \frac{3}{4}\varepsilon_s f_{CM}\overline{E}^2 + \frac{1}{2}\varepsilon_s r f_{CM}\overline{E}\cdot\frac{\partial\overline{E}}{\partial r}$$

If it is assumed that the electrical field arises from a voltage V applied between the fluid in the tube and a second, pointed electrode positioned a distance d outside the tube and within the suspending medium, then, to illustrate the effects on packet pressure, the potential configuration can be approximated as being broadly similar to that produced by a source of strength V/2 and a sink of strength −V/2 of a vector field positioned at the origin and Z=d in the two dimensional complex plane, respectively. By superposition theory, the potential distribution in the z-plane is then $$V(z) = \frac{V}{2}[\log(z) - \log(z-d)].$$

Differentiating with respect to z the vector field and field gradient are obtained, respectively, as $$\overline{E}(z) = \left(\frac{Vd}{2}\right)\left(\frac{1}{z(d-z)}\right) \text{ and } \frac{\partial\overline{E}(z)}{\partial z} = -\left(\frac{Vd}{2}\right)\left(\frac{d-2z}{z^2(d-z)^2}\right).$$

Substituting these expressions into that for the pressure change at the fluid-suspending medium interface, the following equation is obtained:

$$P = \frac{\varepsilon_s}{2}\left(f_{CM}\left(\frac{Vd}{2}\right)\right)^2\left(\frac{1}{(z^2(d-z))^2}\right)\left\{\frac{3}{2} - \frac{r(d-2z)}{z(d-z)}\right\}.$$

The pressure induced electrically depends upon the square of the voltage V, implying not only that the direction of the applied voltage is unimportant but that alternating current (AC) fields may be used. In practice, the use of AC fields is very advantageous because fields of sufficiently high frequency may be coupled capacitively from electrodes insulated by a thin layer of dielectric material (such as Teflon or any other suitable insulating material) into chambers where fluid packet manipulations are to be carried out. In addition, the use of AC fields permits the frequency dependencies of the dielectric permittivity of the fluid, $\in^*_f$, of the suspending medium, and that of any matter within the fluid, to be exploited if desired. These frequency dependencies result in different behavior of the materials at different applied field frequencies and, under appropriate circumstances, may result in useful changes in the direction of dielectrophoretic forces as the frequency is varied.

To an approximation, the effect of the electrical field on packet formation at the tube outlet may be judged by examining the pressure properties along the x axis at the position z=r. Substituting this condition into the pressure equation in the early stages of packet formation when r is small compared to the distance d to the other electrode, the following approximate expression may be written:

$$P \approx \frac{\varepsilon_s}{2}\left(f_{CM}\left(\frac{V}{2r}\right)\right)^2\left\{\frac{3}{2} - 1\right\} = \frac{\varepsilon_s}{4}\left(f_{CM}\left(\frac{V}{2r}\right)\right)^2.$$

In this case, the pressure change at the fluid-suspending medium interface is dominated by the dielectric energy resulting from displacement of the suspending medium.

It should be stressed that this pressure change does not depend upon net charge on the packet, and this even further distinguishes this dielectric method from those that depend upon net electrostatic charging as a means for injection of packets or for forming particulates or aerosols. Indeed, when AC fields are used for dielectric injection, the presence of net charge does not alter the pressure induced by the applied AC field because the time-averaged magnitude of an AC field is zero. However, if desired, the dielectric method may be used to improve injection of charged packets. By applying a DC voltage component to the fluid in addition to an AC component, the injected packets will carry a charge that affects the injection characteristics.

The dielectrophoretic forces may be generated by an array of individual driving electrodes fabricated on an upper surface of a reaction surface. The driving electrode elements may be individually addressable with AC or DC electrical signals. Applying an appropriate signal to driving electrode sets up an electrical field that generates a dielectrophoretic force that acts upon a packet contained in an injection tip or vessel. Switching different signals to different electrodes sets up electrical field distributions within a fluidic device. This can be used for the injection of different packets from different injection tips into the device. Such electrical field distributions may be utilized to inject packets into a partitioning medium.

Dielectric Injection of Fluid Packets into Low-Dielectric Constant Liquids

In the case of water packets being injected into an immiscible, low-dielectric constant suspending medium, the water is much more polarizable than the suspending medium and $f_{CM}$ assumes a value very close to +1. In this case, the pressure in the packet is increased by the presence of the electrical field.

In a packet injection, V may have a value of about 180 Volts and, with a 5 micron tube diameter and an applied hydrostatic pressure of about 50 kPa (see the pressure-packet volume data for injection into bromododecane given in FIG. 1), then the pressure increment P arising from the voltage application is calculated to be about 18 kPa. The combined hydrodynamic and dielectric pressures on the fluid-suspending medium interface, therefore, total 50 kPa+18 kPa=68 kPa, which is well in excess of the hold off pressure for the orifice shown in FIG. 1. Therefore, fluid will flow from the tube into the packet and will allow a packet of large size to be formed. Once the packet volume exceeds 30 fl, the pressure needed to inflate the packet still further falls below 50 kPa (see FIG. 1) and the packet will continue to grow in size even if the electrical field is removed at that point.

However, if the field is maintained, the above pressure equations reveal that the sign of the dielectrophoretic pressure term will change when r>d/2, and the dielectrophoretic force will not only aid packet growth but will also provide a lateral force component directed towards the other electrode.

In general, packets will not remain perfectly spherical as assumed in the above derivations because they will conform to a shape in which the pressure at the fluid-suspending medium interface is equal everywhere at the fluid-suspending medium boundary. The equations above assume that the packet remains spherical. Lateral forces may also be applied to the packet by dielectrophoresis. Once these exceed the effective adhesion forces joining the packet to the orifice of the tube and the column of fluid within it, the packet will sheer from the orifice and be pulled towards the collection electrode. It is to be understood that one or multiple electrodes may be configured for the purpose of injecting packets in this way and that a variety of electrode geometries may be used. Additionally, fluid packets injected previously and sitting on the electrodes may themselves distort the field in ways that can usefully be employed for modifying injection behavior.

It is to be understood that the underlying principles expressed above may be adapted to other situations and that, in general, numerical techniques known in the art such as finite element and other methods may be used to make simulations of packet injection characteristics for any desired geometry.

A packet injection is shown in FIG. 2 where a hydrostatic pressure below the hold-off pressure is present in FIG. 2A, and the electrical field has just been applied to supplement the pressure and draw fluid into the packet, displacing the suspending medium. The packet grows in FIGS. 2B and 2C, but the dielectrophoretic force emanating from the field gradient close to the injection tip pulls the packet back towards the tip. Once the packet grows beyond half-way to the electrode, the dielectrophoretic force helps to increase fluid injection and pulls the packet towards the electrode. In FIG. 2E, lateral forces have overcome the cohesion between the packet, the column of fluid in the injection tube, and the tube orifice, and the packet has detached, moved to the electrode, and conformed to the high field regions surrounding the tip and edges of the electrode. In this way, and by modifying one or more of the parameters listed below in Table 1, one may consistently and automatically meter fluid packets onto any surface. In this manner, consistent, high-resolution microfluidic processing may be achieved.

The expression used above for the potential distribution V(z) is appropriate for a two-dimensional plane rather than a three dimensional space as applicable to some cases where the electrodes are planar, and the packets are manipulated on a planar surface. In other cases, three-dimensional equations may be better suited and, in still other cases, computer simulations of the type known in the art may be required when analytical solutions cannot be obtained. Nevertheless, the physical principles underlying packet formation is essentially the same in all these cases as that described here for illustrative purposes, and the magnitude of the pressure changes in the packets induced by the fields will be comparable in magnitude.

Once injection of a first packet has been accomplished, additional packets may be injected and fused with the first packet to form a larger packet. Such applications are explained in U.S. patent application Ser. No. 09/249,955, which has been incorporated by reference. In some cases, packet formation at the orifice may proceed until the forming packet becomes detached from the orifice when it touches a previously injected packet. Fluid may be metered out and packets of different sizes may be made by dielectric injection. Since the packet injection occurs under the influence of applied electrical fields in one embodiment, automated electrically controlled packet formation may readily be accomplished by switching the fields on and off, or by appropriately adjusting the signals to accomplish the injection of packets. Once injected, packets may be used in situ or else manipulated and moved to desired locations by dielectrophoresis, traveling wave dielectrophoresis, or any other suitable force mechanism following injection. Techniques for the manipulation of the packets is described in U.S. patent application Ser. No. 09/249,955 now U.S. Pat. No. 6,294,063.

Parameters Affecting Packet Injection

It is instructive to examine some of the parameters that influence the pressure, size, and formation of packets injected by dielectric means. These include those listed in Table 1 below:

TABLE 1

Parameters that influence the pressure, size, and formation of packets injected by dielectric means

| | |
|---|---|
| $\gamma$ | the interfacial tension of the fluid in the suspending medium, which will be affected by surfactants and solutes in the fluid and by the properties of the suspending medium |
| $P_f$ | the hydrostatic pressure applied to the fluid in the tube and how close it is to the hold-off pressure |
| $\alpha$ | the diameter of the tube from which the packet formation takes place |
| $\epsilon^*_s$ | the dielectric permittivity of the suspending medium including any contribution from matter contained therein |
| $\epsilon^*_f$ | the dielectric permittivity of the fluid being injected including any contribution from matter contained therein |
| $\upsilon$ | the frequency of the applied field that effects packet formation |
| V | the applied voltage that induces packet formation (in the case of an AC field, V is the root-mean-square (RMS) voltage) |
| d | the effective distance between the tube from which the packet is injected and the electrode that creates the field. d will be an effective value if there are multiple electrodes that create the field |
| $G_{ch}$ | the geometry of the chamber into which injection occurs, including the geometry of the tube from which injection occurs |
| $G_{el}$ | the geometry of the electric field used to inject packets and manipulate them after injection resulting from the injector tube, the system of electrodes that produces the fields, and the voltages applied to or induced in each of these components. |
| $G_{fl}$ | the geometry of any packets already in the chamber and their position with respect to $G_{el}$ |

With the benefit of the present disclosure, those having skill in the art will recognize that any one, or any combination of the above factors may be modified, without undue experimentation, in order to achieve different injection characteristics.

Additional Issues

The pressure needed to remove the packet from the tube may deviate from the expressions given above if surface characteristics of the tubing make a significant contribution to the energetics of the fluid being injected. This can occur if the tubing surface has an affinity for the fluid or else has the tendency to repel it. For example, if the fluid were water, then a hydrophilic tubing surface may contribute a binding energy that may tend to hold the packet in place more strongly. In contrast, a hydrophobic surface would contribute a repulsive force that would make it easier for the packet to break free from the orifice during injection. By modifying the surface of the tube, the energetics of fluid injection may be controlled, affecting, in turn, the injection characteristics.

An example of modifying the tubing surface is the silanization of glass tubing to render it highly hydrophobic. It is much easier to separate aqueous packets from a silanized glass tube orifice than from a tube orifice that is hydrophilic.

Although the discussion above relates to dielectrophoretic force(s) aiding in the injection of a fluid packet, it will be understood that any number of different types of forces may be utilized to achieve the fluid packet injection described herein. Specifically, other separation forces may be employed. For example, acoustic and/or vibrational energy may be used to effectively shake loose a packet from an orifice. If the suspending medium is of low viscosity, such motion-induced packet separation may be inertial. On the other hand, if the suspending medium is of sufficiently high viscosity, then packet detachment may be produced by hydrodynamic drag between the packet and the suspending medium as the orifice is withdrawn sufficiently quickly. With the benefit of the present disclosure, those having skill in the art may choose to rely upon other separation forces. All such other forces sufficient to separate a fluid packet from an orifice onto a surface to achieve metered injection fall within the spirit and scope of the present application.

As used herein the specification, "a" or "an" may mean one or more. As used herein in the claim(s), when used in conjunction with the word "comprising", the words "a" or "an" may mean one or more than one. As used herein "another" may mean at least a second or more.

The following examples are included not for limitation but, rather, to demonstrate specific embodiments of the invention. It should be appreciated by those of skill in the art that the techniques disclosed in the examples which follow represent techniques discovered by the inventors to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Programmable Fluid Processor

In one embodiment, packets of metered size may be injected from one or more inlet ports on the sidewall(s) of a programmable fluid processor (PFP), such as the apparatus described in U.S. patent application Ser. No. 09/249,955, now U.S. Pat. No. 6,294,063 by dielectrophoresis into an immiscible carrier liquid covering a reaction surface.

Fluid flow may be made to be digital, rather than continuous, in the PFP, and the packets may be controlled electronically. The only moving parts in such a setup will be the fluid packets, and no valves or mechanical pumps will be required. Injectors according to the present disclosure may be attached directly to adjacent reservoirs containing reagents or any other suitable fluid or gas. Packets may vary widely in size, but in one embodiment may have diameters from about 20 to about 100 $\mu$m. The packets may have volumes that vary widely, but in one embodiment the volumes may be in the 0.1 to 1 nL range. On-chip reservoirs according to the present disclosure having about 10 $\mu$L volumes may thus each provide up to about $10^5$ reagent packets, which would be enough for 1 assay per minute for about 60 days.

Figure 3:
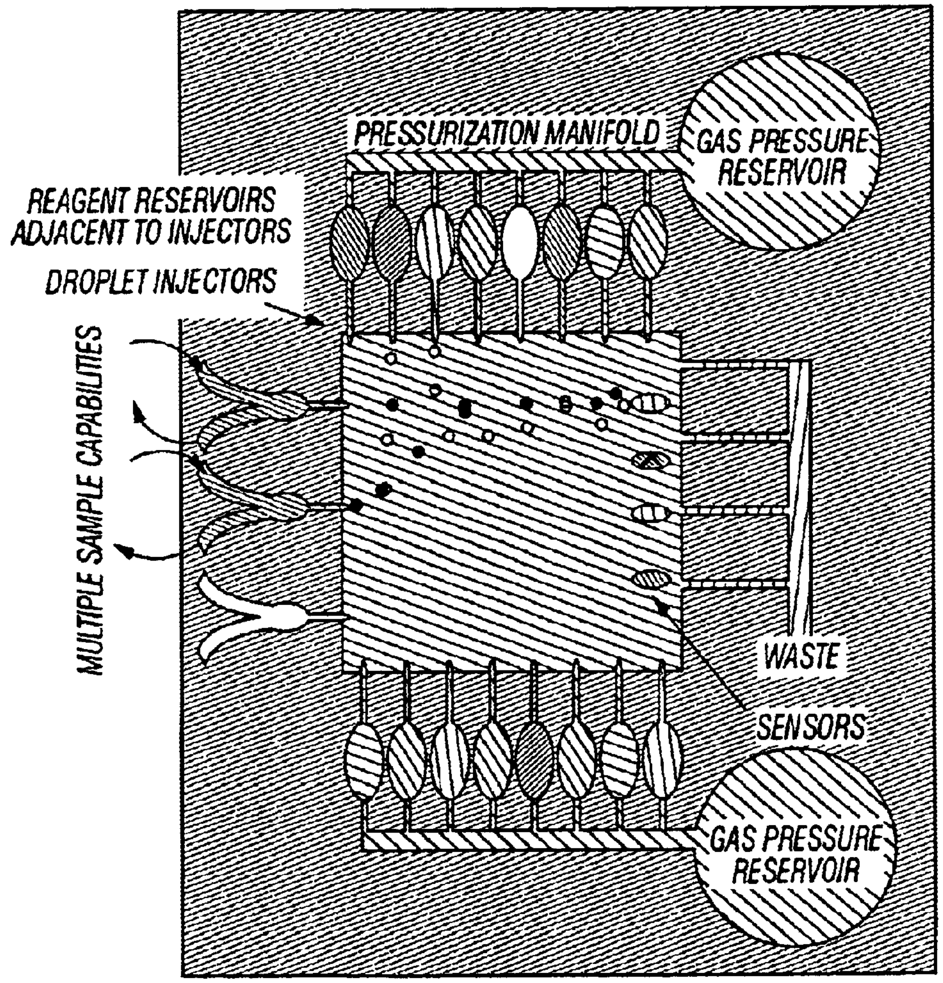
FIG. 3 is a schematic that shows a general purpose analysis apparatus according to embodiments of the present disclosure. The apparatus uses packet injection techniques as described herein.

A design of a PFP-based general-purpose bioanalysis apparatus termed a "BioFlip" is shown in FIG. 3. It is shown executing two separate assays that require the sampling of two sample streams followed by the mixing and sequencing of two reagents, taken from a choice of 16.

Samples and reagents, represented by different shadings, are present in the reservoirs and injectors in the BioFlip. Fusing of packets is illustrated, as is the ability of packet streams to cross without colliding (see disclosure contained in U.S. patent application Ser. No. 09/249,955 now U.S. Pat. No. 6,294,063 for details involving packet manipulation). In the processes shown, the stream of packets passes over a sensor, such as an impedance sensor, and is later routed to one of the four waste lines. The possibility of choosing from 16 reagents allows different assays to be run. Depending upon how extensive the reaction surface is made, large numbers of completely different assays may be run in parallel. The discrete nature of the packets means that the different assays may be interleaved both spatially and temporally.

As illustrated, the reservoirs may be integral with pipettes (shown as long, narrow extensions of the fluid reservoirs). Alternatively, separate fluid reservoirs may be used, and those separate reservoirs may be coupled, according to any means known in the art, to the fluid injectors, which may be micropipettes, tubes, or the like. Coupled to each of the reservoirs is a gas pressure reservoir. As described previously, gas pressure may be used to apply pressure to fluid within a reservoir so that, for example, a hold-off pressure may be achieved. The gas reservoir may be coupled to the fluid reservoir by any of the various means known in the art. As illustrated, the coupling is accomplished via a pressurization manifold. Such a manifold may include any number of valves, gauges, and other instrumentation that facilitates the monitoring and application of gas pressure to the fluid reservoirs and fluid packet injectors. Additionally, suitable optical monitoring equipment, such as CCD cameras or the like may be used to visually monitor the operation of the injectors, reservoirs, or entire system.

EXAMPLE 2

Fluid Processing System

Figure 4:
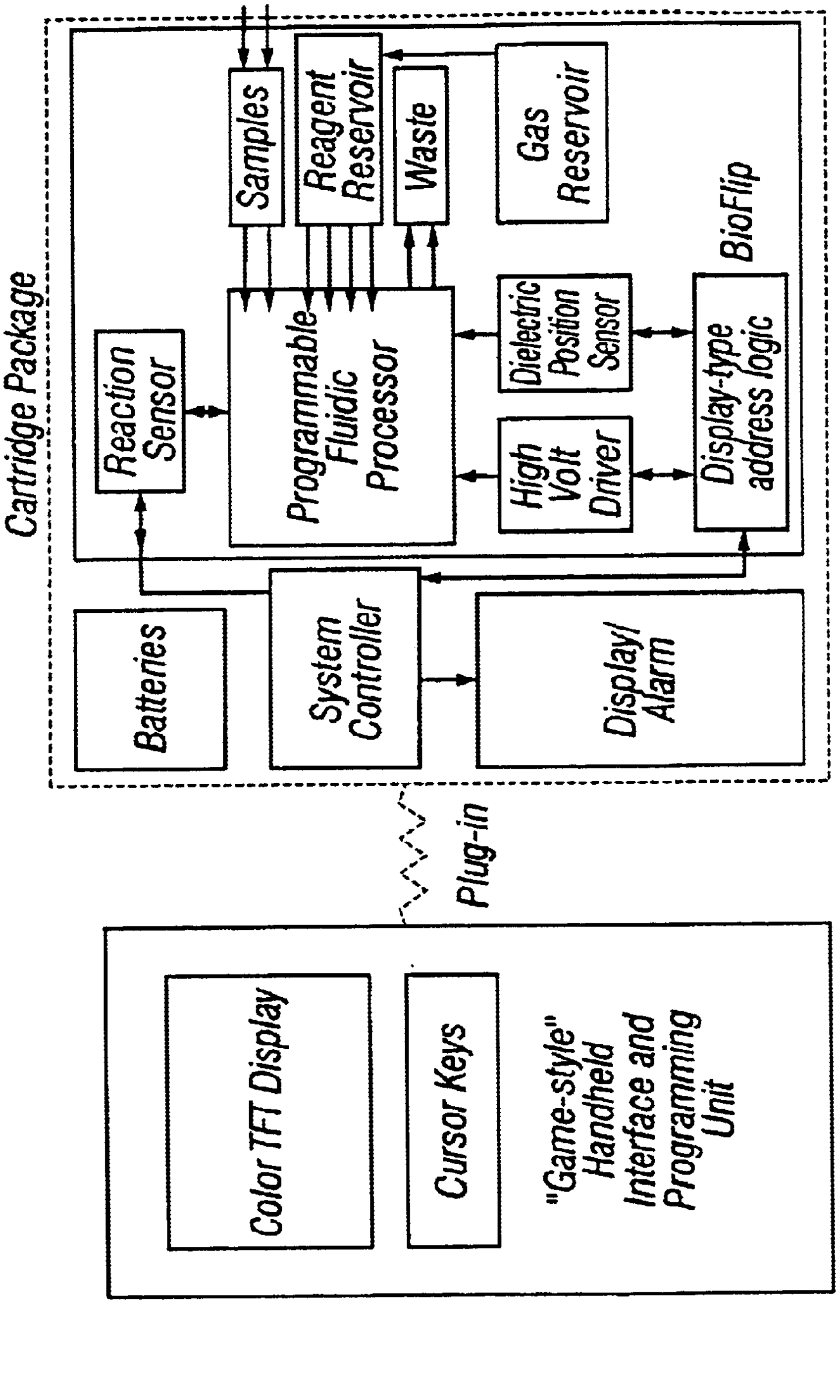
FIG. 4 is a schematic that shows another general purpose analysis apparatus according to embodiments of the present disclosure. The apparatus uses packet injection techniques as described herein.

FIG. 4 shows a block diagram of a fluid processing system that uses injection technology in accordance to the embodiments disclosed herein. On the right side of FIG. 4 is shown a fluidic processing apparatus termed the "BioFlip." This may vary in size significantly, but in one embodiment its size may be about 3"×2"×0.5". It may be in the form of a cartridge equipped with no more user interface than an alarm and a small LCD. It may be self-contained and operate autonomously. It may be programmable by a handheld unit (Windows CE or Gameboy-style) shown on its left.

The packet injection of material from the sample and reagent reservoirs may be controlled by dielectrophoresis with a no moving parts, the packet size may be controlled by varying parameters discussed above and listed in Table 1 such as orifice size and/or pressure, the packets may be moved anywhere on a two-dimensional array via dielectrophoresis or another suitable manipulation force, the packets may be fused, and chemical reactions may be made to occur when sample and reagent packets are fused on an array. Such reactions have been viewed on 2×8 and 8×8 open-top arrays of photolithographically-patterned gold electrodes on glass, driven by discrete electronics.

Figure 5:
FIG. 5 is a picture that shows a stream of 57 micron packets being pulled from a micropipette tip by a dielectrophoretic field according to embodiments of the present disclosure.

A picture illustrating packet injection from a glass micropipette of about a 5 $\mu$m orifice diameter by dielectrophoresis is shown in FIG. 5. With pipette size, pipette tip to electrode spacing, pressure and AC voltage adjusted within appropriate ranges, packet size and injection rate can be electrically controlled. The picture shows, for example, a stream of 57 $\mu$m (~100 pL) packets being pulled from a micropipette tip by a dielectrophoretic field. Appropriate actuation of the field allows single or multiple packets to be injected.

Packets may be moved across the array immediately, or they may be left on a proximal electrode so that they are made to fuse with additional packets being metered onto the surface to form larger volumes with integer volume relationships. Injection rates of tens of packets per second are attainable. In the illustrated embodiment, voltages of about 100 to about 200 volts peak-peak for injection and about 30 volts peak-peak for movement were used. However, in other embodiments, these values may vary widely.

EXAMPLE 3

Pressure Relationships

The static pressure differential necessary to maintain a packet is generally expressed by:

$$P_{in} - P_{ext} = \frac{\gamma}{r}$$

where $P_{in}$ and $P_{ext}$ are the internal and external hydrostatic pressures, $\gamma$ is the surface tension and r is the radius of the packet. Thus, the pressure differential necessary to maintain a packet is inversely proportional to the radius of the packet.

Since water adheres to hydrophilic glass, injected packets tend to remain attached to the tip of the injector pipettes unless the outer surface is made hydrophobic. This may be done by dip-coating the pipettes in a anti-wetting agent such as, but not limited to, Sigmacote®, a silicone solution in heptane, or a fluoropolymer, such as PFC1601A from Cytonix, Inc.

The pressure inside a packet is inversely proportional to its radius. Therefore, if the meniscus is flat at the injector tip, it has infinite radius and zero pressure. As fluid flows to form a nascent packet, the meniscus radius decreases until the packet reaches a radius related to the injector aperture diameter, the wetting energy of the injector tip, and the interfacial energy between the packet and the immiscible suspending fluid. In this regime, pressure increases with increasing nascent packet volume, holding off fluid flow and inhibiting packet formation. Above a critical volume, however, the packet radius increases with increasing volume and the pressure in the packet decreases, encouraging fluid flow and packet formation. Thus an injector will "hold off" packet formation up to some critical hydrostatic pressure.

As long as the applied hydrostatic pressure is less than or equal to the hold off pressure, the aqueous/hydrocarbon boundary will remain stable and no fluid will be injected onto the reaction surface. However, an applied dielectrophoretic force (or other type of force) acting on the nascent packet may effectively supplement the hydrostatic force, lowering the potential barrier to packet injection. In this way, fluids may be withdrawn from the pipette onto the reaction surface using a combination of hydrostatic and dielectrophoretic forces only.

EXAMPLE 4

Injection Considerations

Figure 6:
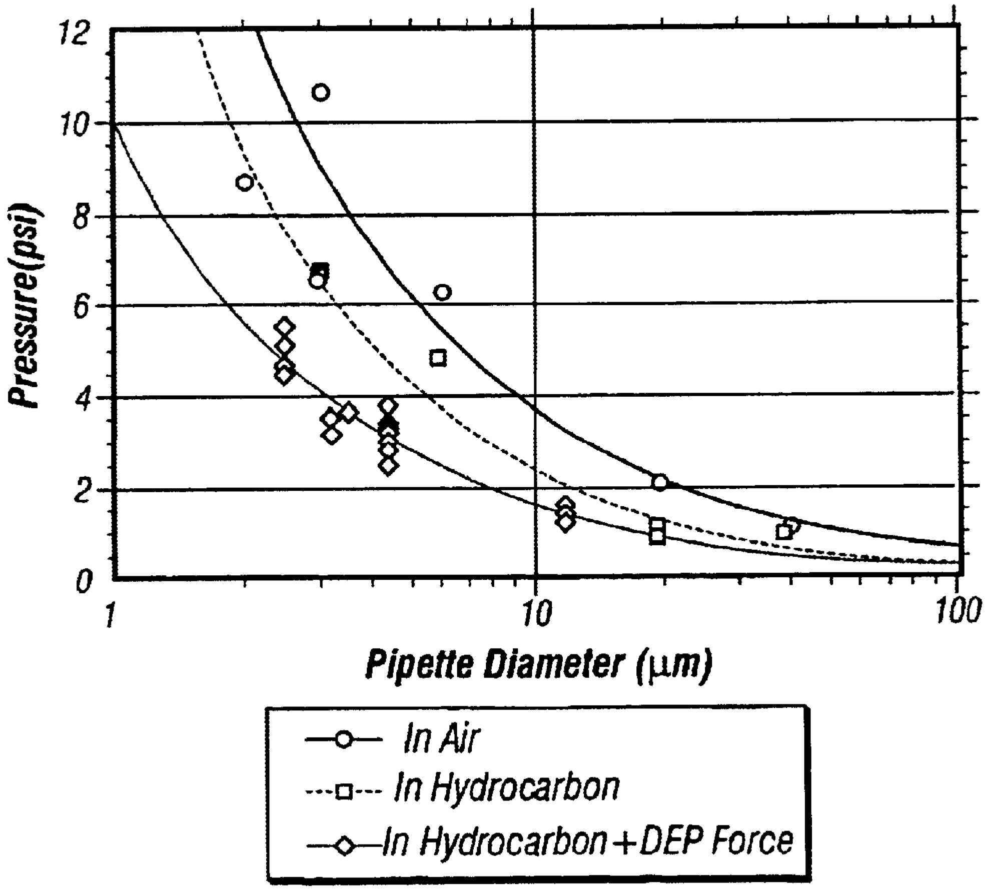
FIG. 6 is a graph that shows the relationship between pressure and pipette diameter according to embodiments of the present disclosure.
Figure 7A:
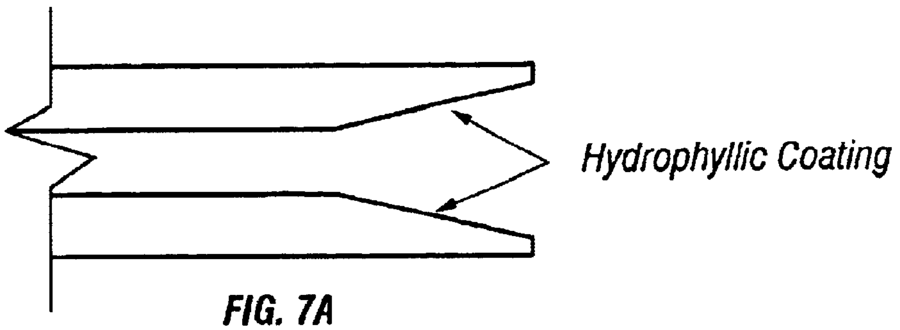
FIG. 7A, FIG. 7B, FIG. 7C and FIG. 7D show a schematic illustrating meniscus valve principles in accordance with embodiments of the present disclosure.
Figure 7B:
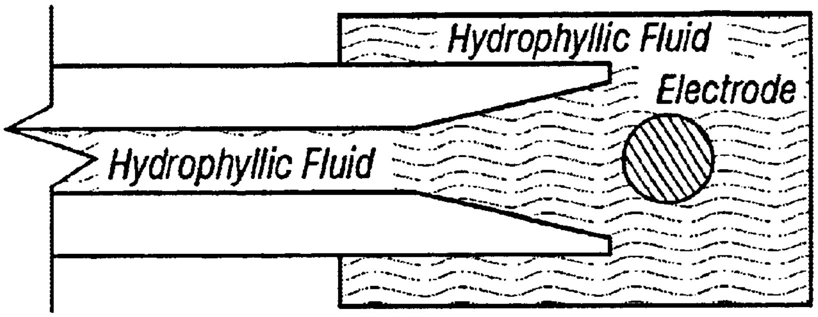
Figure 7C:
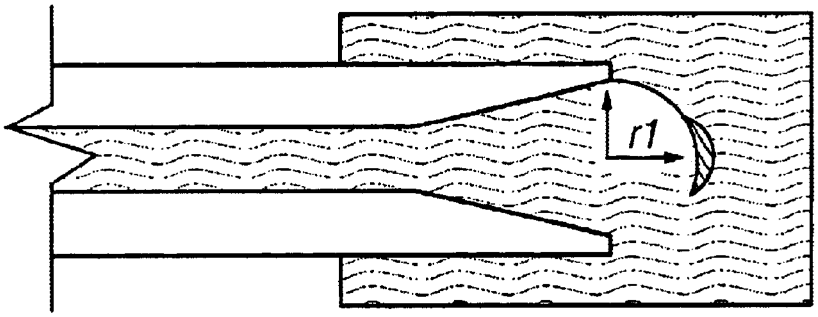
Figure 7D:
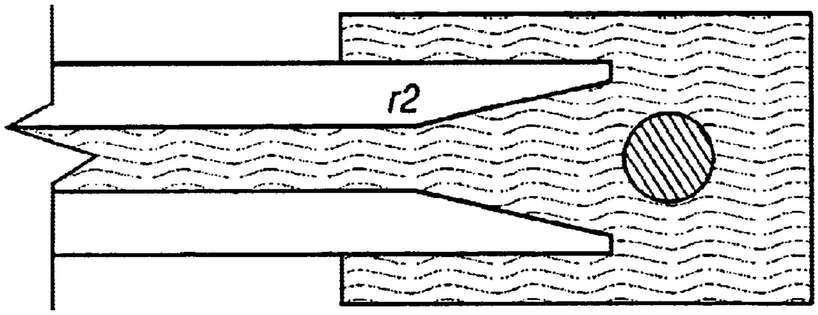

The inventors have used dielectrophoretic forces to inject aqueous packets onto 2×8 and 8×8 PFPs. The two upper curves of FIG. 6 illustrate how the static pressure necessary to spontaneously inject an aqueous packet from a pipette varies with the pipette aperture diameter and the medium into which the packet is injected. The lower curve shows how a dielectrophoretic force applied to the region around the pipette aperture reduces the static pressure at which a packet is injected. The difference between the dielectrophoretic injection pressure and the static injection pressure is the "hold off" provided by the injection aperture. By applying a sub-injection priming pressure, a true "no-moving-parts" pump using dielectrophoretic forces only, reagent packets may be injected onto a reaction surface.

FIG. 6 shows that about 8 psi is low enough to prevent spontaneous injection of an aqueous packet into a hydrocarbon from an aperture about 2.5 μm in diameter. Larger apertures hold off injection at lower pressures. Control of the diameter of injected packets may be investigated in detail as a function of pipette aperture, dielectrophoretic potential, pipette-to-electrode separation, and hold off pressure.

Packets have been injected from apertures from about 2.5 to about 12 μm in diameter, DEP potentials from about 100 to about 250 $V_{p-p}$, pipette to electrode separations from about 30 to about 300 μm, and hydrostatic pressures from about 1.3 to about 5.5 psi.

Aqueous packets have been injected onto the surface of a PFP via glass micropipettes to which water readily adheres. Dip-coating the pipettes in a anti-wetting agent such as Sigmacote®, a silicone solution in heptane, or PFC1601A from Cytonix, Inc., a fluoropolymer, reduces water adhesion and may facilitate the injection of packets onto a PFP surface.

EXAMPLE 5

Differential Meniscus Valve

In one embodiment, a differential meniscus valve may be used as a means for metering fluid packets into a programmable fluidic processor ("PFP"), and for collecting them after processing. The inventors have noted that there appears to be two distinct contributions to the behavior of trapped air bubbles, namely the relative adhesion energies of air and water to the chamber surface, and the radius of curvature of the bubble. The latter is related inversely to the bubble pressure. The differential meniscus valve of the present disclosure is designed to exploit these two properties in order to construct a valve suitable for the injection of fluid packets into a hydrophobic fluid as in PFP devices, which include programmable dielectrophoretic arrays and programmable electrophoretic arrays.

A differential meniscus valve is illustrated in FIG. 7. The illustrated device has no moving parts and no constrictions. The principle of operation is also illustrated in FIG. 7A. There, the PFP chamber is assumed to be to the right, the source of liquid (a reservoir or other suitable container) to be injected to the left. The microfluidic tube flares toward the end that is in the PFP chamber, and its inside is coated with a hydrophilic material. Any hydrophilic material known in the art may be used.

Figure 2A:
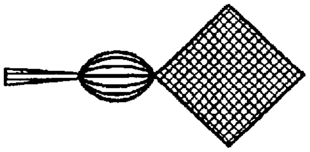
FIG. 2A, FIG. 2B, FIG. 2C FIG. 2D and FIG. 2E is a schematic that shows the stages of dielectric packet injection according to embodiments of the present disclosure.
Figure 2B:
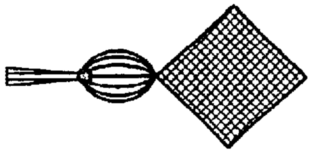
Figure 2C:
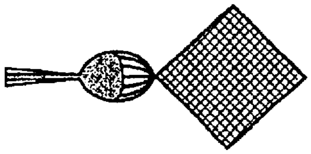
Figure 2D:
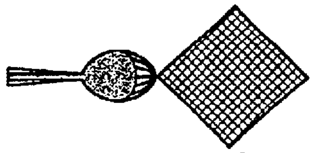
Figure 2E:
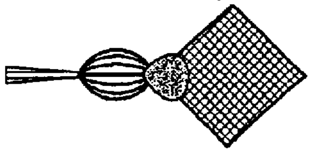

When the chamber and tube are filled, as in FIG. 2B, the spreading energy of the hydrophilic fluid along the hydrophilic surface tends to pull the hydrophilic fluid to the end of the flared region. If pressure is now exerted for the hydrophilic fluid end at left, as shown in FIG. 2C, a packet will begin to form. The radius of curvature as this packet forms, r1, will be controlled by the radius of the flared opening. Because this radius is large, the pressure in the packet will be relatively small. If, on the other hand, pressure is applied to drive the hydrophilic liquid into the tube, the hydrophilic surface will prevent adhesion of the hydrophobic fluid to the tube surface. The leading edge of the hydrophobic fluid will therefore be forced to assume a much smaller radius, r2, as it tries to enter the narrower section of the tube. Because r2 is smaller than r1, the pressure required to drive hydrophobic fluid into the tube will be larger than that needed to drive hydrophilic fluid in the opposite direction to form packets in the chamber.

EXAMPLE 6

Differential Meniscus Injectors

In one embodiment, a packet injector may be used that incorporates the differential meniscus valve described above. In particular, The tip of PEEK tubing connectors may incorporate the differential meniscus valve design. The tip of PEEK tubing connectors may be precision-machined to match the required injector shape, as determined by calculations using software known in the art, such as Surface Evolver software. Precision-machining provides the flexibility to create a wide range of shapes with quick turn-around time. Injectors (and collectors) may be micromachined according to techniques known in the art to increase density, and to reduce the minimum injected packet size.

An external pressure source for operating the valves may be provided by a syringe pump, pressurized reservoir, or the like. In addition, as discussed above, a dielectrophoretic force, or other suitable manipulation force may be used in conjunction with the meniscus valve injector to both inject and collect packets. The source reservoir may be coated with a hydrophobic layer that will have a small positive pressure on the watery content of the reagent, which will be attracted by the hydrophilic coating of the capillary towards the PFP chamber or surface. At the PFP interface, the packet may be pulled from the capillary into the dielectric fluid by applying a potential to one or more electrodes near the injector tip. Once inside the PFP chamber, the packet may be manipulated as desired, then positioned close to the outlet capillary.

EXAMPLE 7

Differential Meniscus Collectors

In one embodiment, packet collectors may use the meniscus valve discussed above. At an outlet capillary, another differential meniscus valve may absorb one or more packets if the field distribution among the electrode(s) close to the outlet are properly selected and switched off when the valve pulling effect is activated. One or more waste reservoirs may have an internal hydrophilic coating as well to minimize any pressure gradient that may keep the reagent inside the capillary.

EXAMPLE 8

Fabrication Examples

Low dead volume connectors may be used for interfacing microscopic fluidic components, such as syringe pumps, with microfabricated, miniature fluidic devices. A 1 mm OD connector may be made by precision machining one end of a length of PEEK tubing such that only the very tip fits within a micromachined orifice in a fluidic chip. In addition, a groove may be machined in the tubing tip to accommodate a small o-ring for creating a seal.

The inside of the tubing tip may be machined to form an appropriately-shaped nozzle. The machined PEEK tubing may then form both the fluidic connector and sample injector, a design which makes sense from an engineering standpoint since the fluidic connector is already required for introducing samples, chamber fluid, and other solutions. Furthermore, using the tubing allows for the coating of the injectors with a hydrophilic film independent of the hydrophobic chamber coating.

Injectors may be fabricated from a PEEK tubing with an outer diameter varying widely in size, but in one embodiment, its outer diameter size may be about 500 microns, and its inner diameter may be about 65 microns, which should be sufficient to produce packets between about 100 and 500 microns in diameter. In this case, a syringe pump or pressurized reservoir with an external valve may be used to inject packets into the chamber.

Injectors may be precision-machined from commercial high-performance liquid chromatography tubing. This is a very different approach to MicroFlume fabrication, which traditionally employs silicon or glass-based micromachining, or plastic molding. Unlike virtually all lithography-based micromachining techniques which are only capable of producing two-dimensional or "extruded" shapes, precision machining allows parts to be formed freely in three dimensions, with tolerances of about 5 microns (comparable to many high-aspect ratio micromachining processes). Fast turn-around on designs is another advantage of precision machining. Once optimal designs are established through precision machining, tooling can be made to mold the parts for high volume production.

Appropriate software known in the art, such as Surface Evolver, which was developed by NIST, may be used to model surface tension, pressure, and geometrical effects that determined the injected packet size. Such programs may also be used to analyze solder bump shape after reflow in the presence of electronic components and may therefore assist in design optimization.

In one embodiment, silicon micro-machining may be used to batch fabricate high-density injector arrays. Micromachining allows for smaller injectors, which will lead to smaller packet sizes, although it will be more difficult to control the injector tip geometry. Alignment of the injectors with a PFP array chip will be more precise with the micromachining approach, and this will be important to packet size, especially if dielectrophoretic forces are relied upon to pull packets into a chamber.

EXAMPLE 9

Dielectric Valve

In one embodiment of the invention, a PFP switching station is envisioned with a dielectric valve. This valve has no moving parts and can control the movement of the packet through the device based on pressure and the dieletric properties of the packet and the surrounding medium. This PFP comprises one or more injection ports, one or more exit or outlet ports and a switching station. A droplet is injected from the injection port with a pressure of:

$$P = \frac{2\gamma}{r}$$

where r is the droplet radius and γ is the interfacial tension of the droplet. The exit port, which is configured as a hydrophilic tube accepts the droplet from the surface of the device depending on the droplet pressure. The size of the exit port opening is inversely related to the pressure required for the droplet to enter the exit port. Therefore, a apparatus with a smaller exit port will require higher pressure (i.e. a smaller droplet diameter or larger droplet interfacial tension) to carry the droplet into the exit port. Varying the size of the exit ports can be used to control fluid flow through the dielectric valve.

The exit port may be any structure allowing egress from reaction surface, such as an opening in a wall or a tube. The opening may be of any suitable size or shape. Alternatively, outlet port may be a micropipette or any other equivalent device able to collect a material from reaction surface. Packets of material may be collected from reaction surface from above. A syringe or any other equivalent device may be attached to a micromanipulation stage so that packets may be precisely collected from specific locations on reaction surface. In one embodiment, the exit port may consist of a cylindrical tube opening onto reaction surface. Such a tube may have a diameter of about 1 millimeter and a length of about 3 centimeters or longer and may be coated to be hydrophilic.

The switching station can be used, for example, when it is desired to inject multiple packets from multiple vessels onto the surface. The switching station allows for the use of multiple vessels and multiple exit ports while using a single device or array, such as an array of electrodes to control the injection of packets onto the surface.

EXAMPLE 10

Holdoff Pressure

Figure 8:
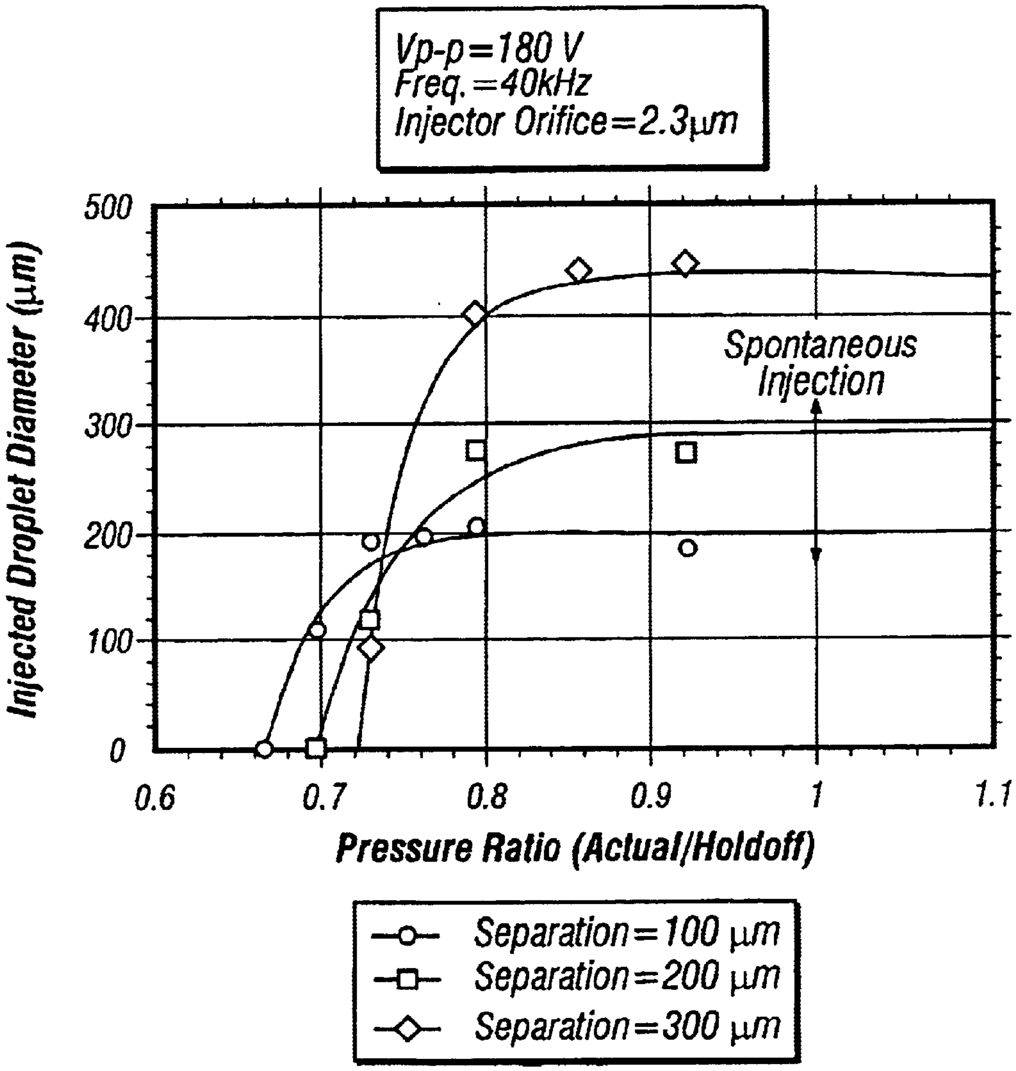
FIG. 8 is a graph that shows the relationship between the holdoff pressure ratio and the injected droplet diameter for separations of 100 $\mu$m, 200 $\mu$m and 300 $\mu$m according to embodiments of the present disclosure.

FIG. 8 illustrates the relationship between the pressure in the fluid handling system, normalized to the maximum holdoff pressure (=1), and the diameter of aqueous droplets injected onto the reaction surface. An injector orifice was positioned near a 100 micrometer (μm) square electrode that was energized with an AC electric potential (the dielectrophoretic, or DEP, field). The applied DEP field was 180 volts peak-to-peak (Vp-p) at 40 kHz. The injector orifice was 2.3 μm in diameter, separated from the edge of the active electrode by 100, 200, or 300 μm. FIG. 8 illustrates that under these conditions DEP droplet injection will not occur when the fluid handling system is pressurized below 0.65 times the maximum holdoff pressure. Also, as the system is pressurized to 0.75 to 0.85 times the maximum holdoff pressure droplets of a fixed size, corresponding to the separation distance plus the electrode width of 100 μm will be injected onto the reaction surface. In the pressure region between 0.65 and 0.85 times the maximum holdoff pressure droplets, or fluid aliquots, of intermediate, controllable, and repeatable diameter are produced. The lines on the graph in FIG. 8 are curves of the form $$a*\exp^{\frac{-(b-c)}{d}}$$

fitted to the data for each separation distance.

Figure 9:
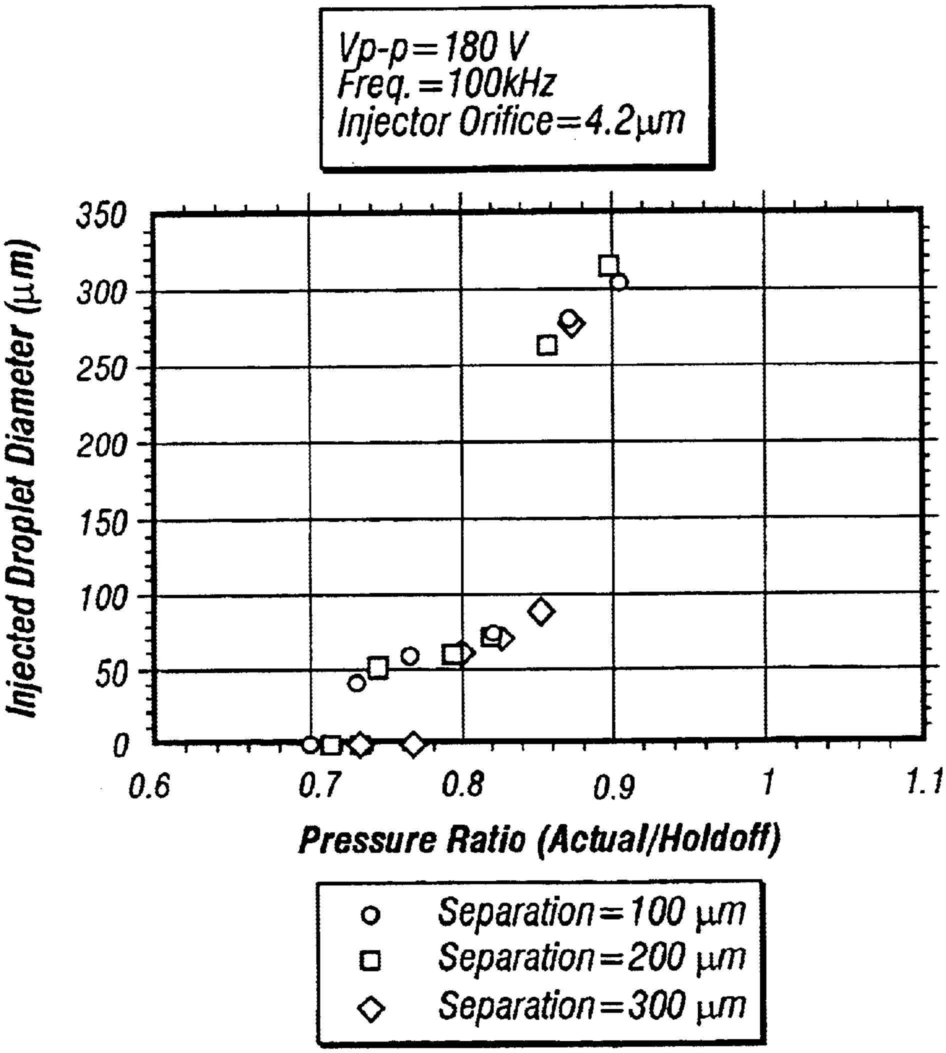
FIG. 9 is a graph that shows the relationship between the holdoff pressure ratio and the initial droplet diameter for separations of 100 $\mu$m, 200 $\mu$m and 300 $\mu$m according to embodiments of the present disclosure.

FIG. 9 illustrates the relationship between the pressure in the fluid handling system, normalized to the maximum holdoff pressure (=1), and the diameter of aqueous droplets injected onto the reaction surface. An injector orifice was positioned near a 100 micrometer (μm) square electrode that was energized with an AC electric potential (the dielectrophoretic, or DEP, field). The applied DEP field was 180 volts peak-to-peak (Vp-p) at 100 kHz. The injector orifice was 4.2 μm in diameter, separated from the edge of the active electrode by 100, 200, or 300 μm. FIG. 9 illustrates that under these conditions DEP droplet injection will not occur when the fluid handling system is pressurized below 0.7 times the maximum holdoff pressure. Also, as the system is pressurized above 0.86 times the maximum holdoff pressure droplets of a fixed size, approximately 300 μm (14 nanoliters) will be injected onto the reaction surface. In the pressure region between 0.7 and 0.85 times the maximum holdoff pressure droplets, or fluid aliquots, of intermediate, controllable, and repeatable diameter are produced.

EXAMPLE 11

Flow-Through Injector

A vessel containing a flow-through injector may be used in an embodiment of this invention. The vessels allows for sample to flow past the injector tip, preferably at a slow flow rate. This allows for the purging of the a few drops of sample such that there will always be fresh sample at the injector tip.

While the present disclosure may be adaptable to various modifications and alternative forms, specific embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. A method for metered injection of a fluid packet, comprising:

pressurizing a vessel containing a fluid to a pressure less than or equal to a hold-off pressure;

subjecting the fluid to an extraction force comprising dielectrophoresis to form the fluid packet and extract the fluid packet from the vessel onto a surface; and removing the fluid packet from the surface through an exit port.

2. The method of claim 1, wherein the extraction force is produced by an electrode.

3. The method of claim 2, wherein the electrode is coupled to the surface.

4. The method of claim 1, wherein the extraction force is produced by an electrode array.

5. The method of claim 1, wherein the vessel comprises a flow-through injector.

6. The method of claim 1, wherein the pressure is between 65% and 85% of the holdoff pressure.

7. The method of claim 6, wherein the pressure is between 75% and 85% of the holdoff pressure.

8. The method of claim 6, wherein the size of the fluid packet is electronically controlled.

9. The method of claim 1, wherein there are two or more exit ports.

10. The method of claim 1, wherein the exit port is coupled to a conventional fluidics device.

11. The method of claim 1, further comprising the metered injection of two or more fluid packets from two or more pressurized vessels.

12. The method of claim 11, further comprising using a switching pump, wherein the switching pump switches the extraction force between a first fluid packet in a first pressurized vessel and a second fluid packet in a second pressurized vessel.

13. A method for metered injection of a fluid packet, comprising:

pressurizing a vessel containing a first fluid to a pressure less than or equal to a hold off pressure, the first fluid comprising a first dielectric material;

energizing one or more electrodes coupled to a surface adjacent the vessel, the surface including a second fluid comprising a second dielectric material;

subjecting the first fluid to an extraction force comprising dielectrophoresis from the one or more electrodes to form the fluid packet and extract the fluid packet from the vessel onto a surface; and removing the fluid packet from the surface through an exit port.

14. An apparatus for moving a fluid packet, the apparatus comprising:

a vessel configured to contain a fluid;

a pressure manifold coupled to the vessel;

a pressure reservoir coupled to the manifold and configured to pressurize the vessel to a pressure less than or equal to a hold off pressure;

a device capable of generating a programmable extraction force, the extraction force comprising dielectrophoresis and being configured to form the fluid packet and extract the fluid packet from the vessel onto a surface;

an exit port coupled to the surface and configured to receive the fluid packet.

15. The apparatus of claim 14, wherein the exit port is hydrophilic.

16. The apparatus of claim 14, comprising a plurality of exit ports.

17. The apparatus of claim 14, further comprising a conventional fluidics device coupled to the exit port.

18. The apparatus of claim 14, wherein the vessel comprises a flow-through injector.

19. The apparatus of claim 14, wherein there are two or more pressurized vessels.

20. The apparatus of claim 19, further comprising using switching pump, wherein the switching pump is configured to switch the extraction force between a first fluid packet in a first pressurized vessel and a second fluid packet in a second pressurized vessel.

* * * * *